(12) United States Patent
Patel

(10) Patent No.: US 8,819,489 B2
(45) Date of Patent: Aug. 26, 2014

(54) ACCELERATED PROCESSING UNIT DEBUGGING USING A GRAPHICS PROCESSING UNIT CENTRIC DEBUG CORE

(75) Inventor: Navin Patel, Ontario, CA (US)

(73) Assignee: ATI Technologies ULC, Markham, Ontario (CA)

( * ) Notice: Subject to any disclaimer, the term of this patent is extended or adjusted under 35 U.S.C. 154(b) by 292 days.

(21) Appl. No.: 13/325,607

(22) Filed: Dec. 14, 2011

(65) Prior Publication Data

US 2013/0159771 A1    Jun. 20, 2013

(51) Int. Cl.
*G06F 11/00*    (2006.01)
(52) U.S. Cl.
USPC .......................................................... 714/30

(58) Field of Classification Search
USPC ........................................................ 714/30, 31
See application file for complete search history.

(56) References Cited

U.S. PATENT DOCUMENTS

| 6,691,266 B1 * | 2/2004 | Winegarden et al. .......... 714/724 |
| 7,711,990 B1 * | 5/2010 | Nickolls et al. ................. 714/37 |
| 2011/0307871 A1 * | 12/2011 | Branda et al. .................. 717/129 |

* cited by examiner

*Primary Examiner* — Michael Maskulinski
(74) *Attorney, Agent, or Firm* — Volpe and Koenig, P.C.

(57) ABSTRACT

An Accelerated Processing Unit (APU) comprising a central processing unit (CPU) core portion and a graphics processing unit (GPU) core portion coupled to the CPU core portion. The GPU core portion includes a GPU core and a dedicated GPU debugging core, the dedicated GPU debugging core enabling performance of GPU centric debug functions.

20 Claims, 3 Drawing Sheets

US 8,819,489 B2

ACCELERATED PROCESSING UNIT DEBUGGING USING A GRAPHICS PROCESSING UNIT CENTRIC DEBUG CORE

BACKGROUND

1. Field

The present disclosure relates to processors and more particularly to debugging using a graphic processing unit (GPU) centric debug core.

2. Description of the Related Art

It is known to provide heterogeneous computing environments in which systems incorporate specialized processing capabilities, such as those exposed from multi-core central processing unit (CPUs) capabilities and discrete graphics processing unit (GPU) capabilities for graphics processing and mathematically intensive computations.

An Accelerated Processing Unit (APU) type processor is one example of a processor which can provide an integrated heterogeneous computer environment. An APU type processor is a processor that combines the advantages of a CPU and a GPU, usually within a single integrated circuit. The APU family of processors avail able under the trade designation Advanced Micro Devices (AMD) Fusion processors are examples of APU type processors.

One challenge associated with an APU type processor relates to the level of complexity from such an APU type processor. Such a level of complexity presents challenges for designers and developers to create efficient high performance systems that operate as expected between multiple contexts. For example, software developers extensively depend on debugging capabilities of their development platforms to enable the developers to track unexpected behavior and system level crashes normally caught by CPU exceptions and traps. However, with the advent of APU type processors, it would be desirable to provide additional levels of debugging capabilities.

SUMMARY OF EMBODIMENTS

In accordance with the present disclosure, an APU type processor is disclosed which includes a CPU core and a GPU core where the GPU core further includes a GPU centric debug core.

More specifically, in one embodiment, the disclosure relates to a method for providing an Accelerated Processing Unit (APU) with enhanced debugging capabilities. The method includes providing a graphics processing unit (GPU) core with a dedicated GPU debugging core; and, using the dedicated GPU debugging core to perform GPU centric debug functions. In a further embodiment, a method for providing a GPU with a dedicated GPU debugging core; and, using the dedicated GPU debugging core to perform GPU centric debug functions.

In another embodiment, the disclosure relates to an apparatus for providing an Accelerated Processing Unit (APU) with enhanced debugging capabilities. The apparatus includes a graphics processing unit (GPU) core portion, the GPU core portion comprising a GPU core and a dedicated GPU debugging core. The dedicated GPU debugging core enables performance of GPU centric debug functions.

In another embodiment, the disclosure relates to an Accelerated Processing Unit (APU) comprising a central processing unit (CPU) core portion and a graphics processing unit (GPU) core portion coupled to the CPU core portion. The GPU core portion comprises a GPU core and a dedicated GPU debugging core. The dedicated GPU debugging core enables performance of GPU centric debug functions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for an APU type processor which includes a CPU core and a GPU core where the GPU core further includes a GPU centric debug core.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
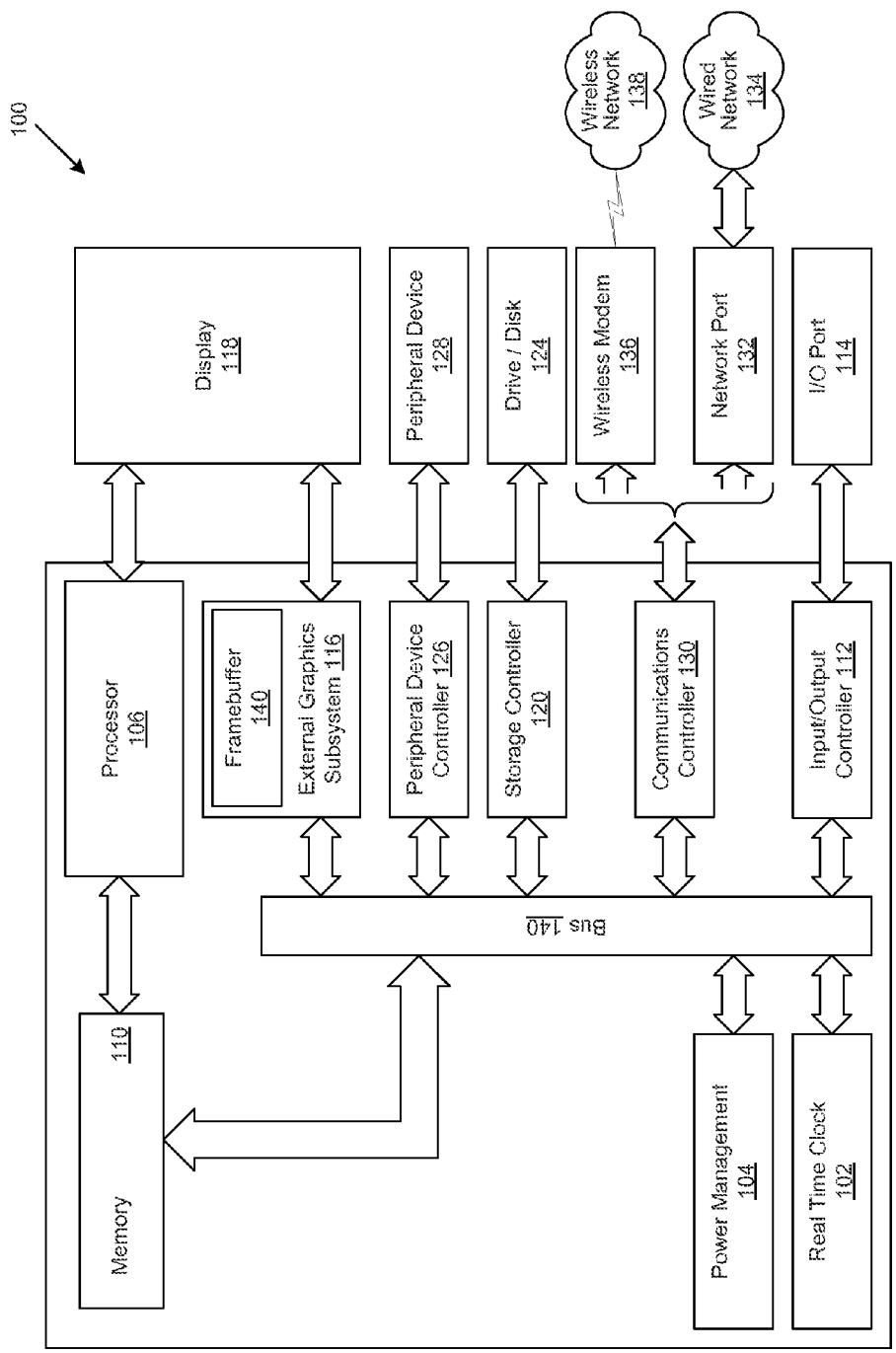
FIG. 1 shows a generalized block diagram illustrating an information processing system.

FIG. 1 is a generalized block diagram illustrating an information processing system 100 as implemented in accordance with an embodiment of the invention. System 100 comprises a real-time clock 102, a power management module 104, a processor 106 (which in certain embodiments may comprise an APU type processor) and memory 110, all physically coupled via bus 140. In various embodiments, memory 110 comprises volatile random access memory (RAM), non-volatile read-only memory (ROM), non-volatile flash memory, or any combination thereof.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. External graphics subsystem 116 is likewise physically coupled to bus 140 and further coupled to display 118. In various embodiments, the external graphics subsystem 116 comprises a Frame buffer 140. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
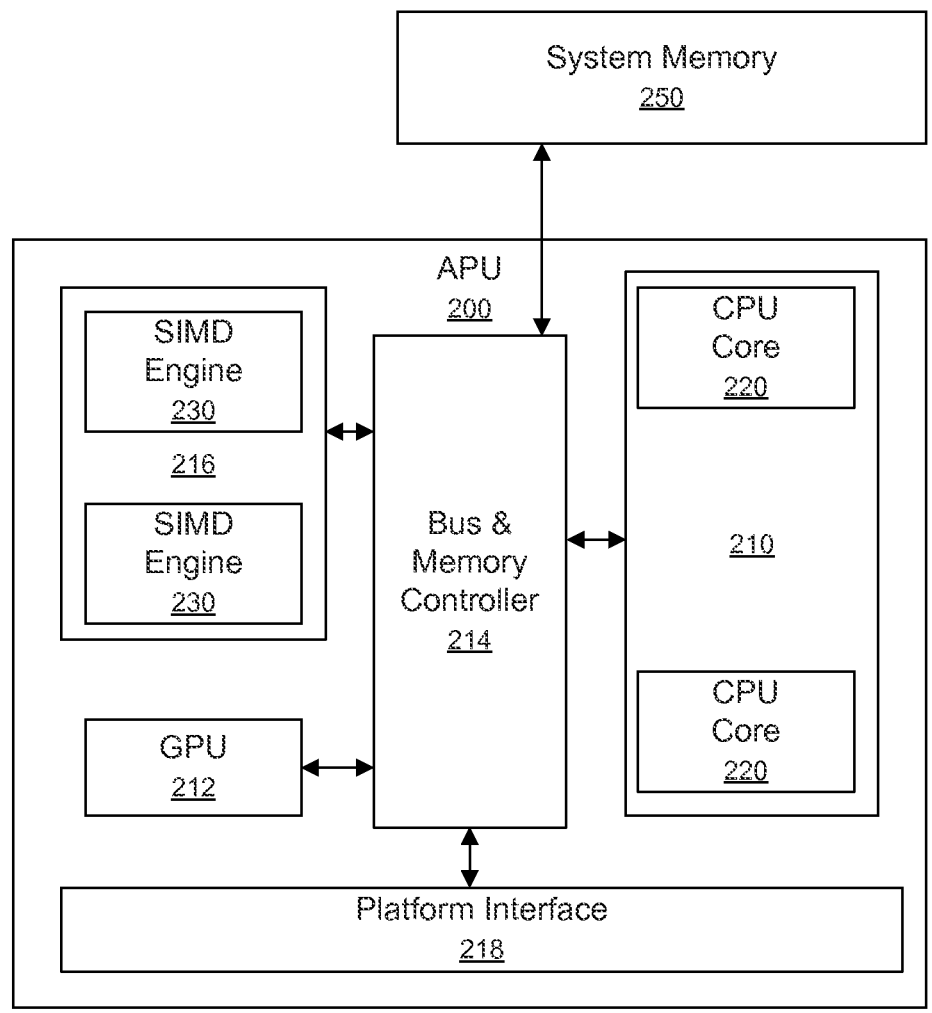
FIG. 2 shows a generalized block diagram an APU type processor.

Referring to FIG. 2, a generalized block diagram an APU processor 200 is shown. More specifically, the APU type processor includes a CPU core portion 210, a GPU core portion 212, a bus and memory controller portion 214 (e.g., a Northbridge portion), a single instruction, multiple data (SIMD) portion 216 as well as a platform interface 218 (e.g., a Southbridge portion). The CPU core portion 210 further includes a plurality of CPU cores 220. The SIMD portion 216 includes a plurality of SIMD engines 230. The APU processor 200 is coupled to system memory 250.

Figure 3:
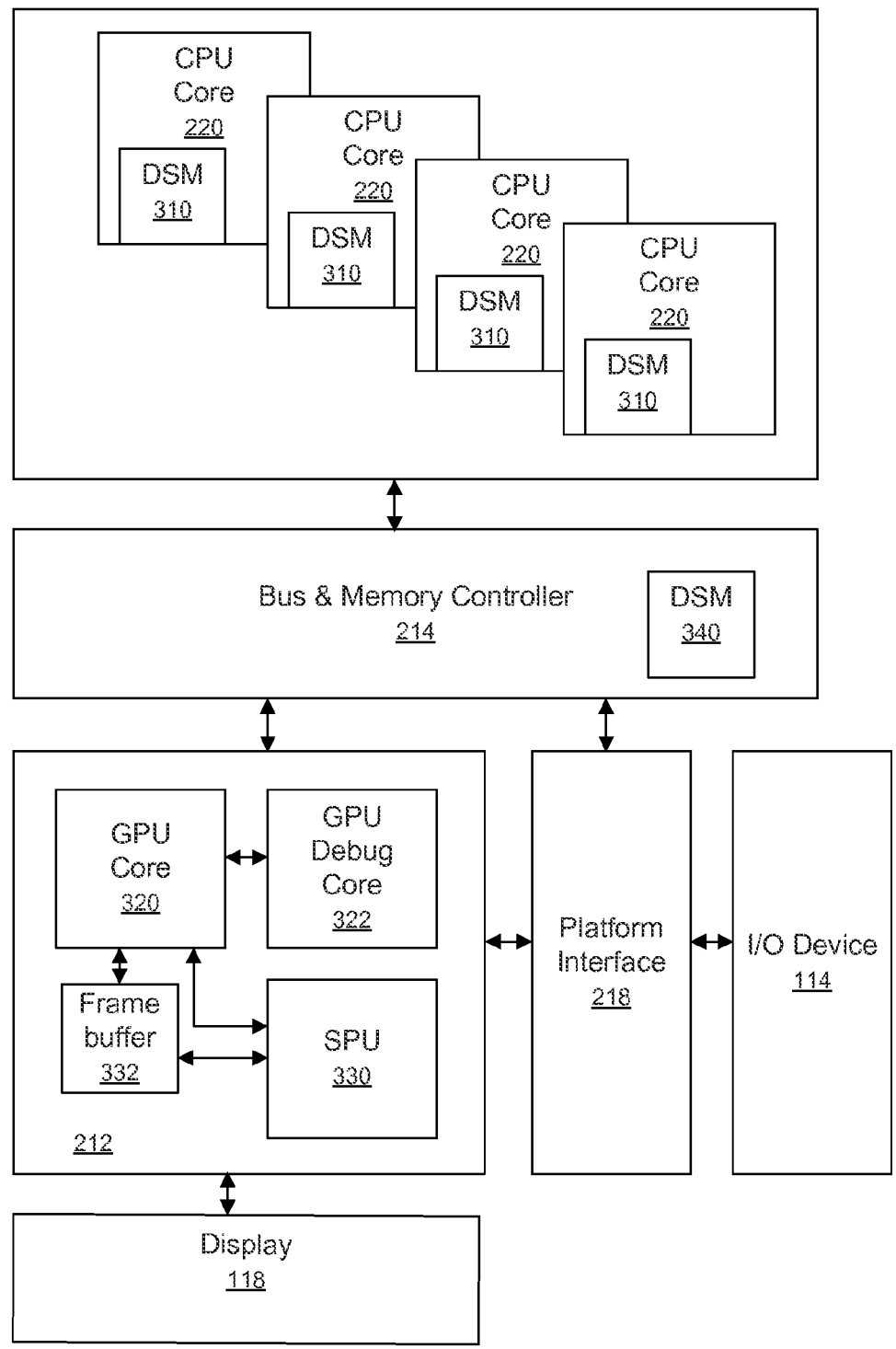
FIG. 3 shows a block diagram of the interaction of various components of an APU processor.

Referring to FIG. 3, a block diagram showing the interaction of various components of the APU processor 200 is shown. More specifically, each CPU core 220 of the CPU core portion 210 includes a respective debug state machine (DSM) core 310. Each DSM core 310 includes respective debug registers. Additionally, the GPU core portion 212 includes at least one GPU core 320 as well as a GPU debug core 322. In certain embodiments, the GPU core portion 212 further includes a secure processing unit (SPU) core 330 as well as a frame buffer 332. The GPU core 320 is coupled to at least one display 118. The bus and memory controller 214 also includes a respective DSM core 340.

In operation, the CPU cores 220 provide hardware based debugging capabilities using debug CPU registers and debugs states. Additionally, the GPU debug core 322 provides a debugging function that is purely reliant on the hosted CPU. By providing the GPU core portion 212 with dedicated debugging capabilities, the GPU core portion 212, and ultimately, the APU processor 200) has access to system memory through the north bridge portion 214 and can arbitrate the states of each accompanying CPU core. Additionally, the GPU based debug core 322 is also able to directly host and debug keyboard and mouse activity. Additionally, the GPU debug core 322 can interact within the GPU core 230 and connect directly to a SPU core 330 component firmware for instructions. The SPU connection provides an advantage in that the SPU core 330 is not powered down as most other components within an APU. The SPU core 330 can also handle access restrictions for protected memory and handle GPU based resister debugging. Additionally, the SPU core 330 can execute program segments which are loaded into the frame buffer memory 332.

The GPU debug core 322 functions in conjunction with any existing debug cores (e.g., DSM cores 310) as a master GPU centrically controlled debugger allowing users to display debug code by implantation of a GPU based internal text editor. This GPU based internal text editor replaces externally connected debug applications and hardware. Presentation of a cursor representing mouse movement and text input via a keyboard is controlled by the SPU firmware. Additionally, in certain embodiments, the display switches between a desktop view to a GPU centric debug editor view via keys programmed by a user configured input device such as a left or right mouse button click or keyboard hot keys. Additionally, in certain embodiments, the GPU centric debug editor is graphics based and uses both the frame buffer 332 as well as the system memory 250. Alternatively, such GPU debug data can be transmitted from the GPU debug core 322 using for example, data files, so that software operating on the CPU can access the data generated by the GPU debug core 322 for display to a user.

With such a debug configuration, all CPU cores 220 can be placed into a debug state. Allowing all CPU cores 220 to be placed in the debug state provides a desirable feature for a developer who is attempting to track down an issue that could be interacting between any one of the cores. Enabling switching between CPU and GPU based debugging can further enhance debugging if problems are related to GPU as well.

Skilled practitioners in the art will recognize that many other embodiments and variations of the present invention are possible.

For example, the debug capabilities may be extended to allow an ability to manipulate JTAG connectivity, handle mouse and keyboard events, upload debug code to the GPU, have the GPU handle user instructions for debug states, display debugged code and move mouse, switch between CPU and GPU debugging, provide for simplification or removal of CPU debug logic cores for shared debug states with GPU debug core. Additionally, the GPU debug core may include GPU based internal text or graphics editor controls. Additionally, the introduction of a centralized GPU hosted debug core saves on real-estate used in the logic cores used by multiple CPU in the APU and will have far more reaching benefits in heterogeneous computing.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removable or remotely coupled to a microprocessor/memory system. Thus, the modules may be stored within a computer system memory to configure the computer system to perform the functions of the module. Other new and various types of computer-readable storage media may be used to store the modules discussed herein. Additionally, software data (e.g., Verilog, HDL, GDSII data) may be used to configure a hardware fabrication facility (also known colloquially as a "fab") by way of generation of maskworks. The fabrication facility, employing maskworks generated from such software data may then be configured to generate hardware devices embodying aspects of the present invention.

Consequently, the invention is intended to be limited only by the spirit and scope of the appended claims, giving full cognizance to equivalents in all respects.

What is claimed is:

1. A method for providing enhanced debugging capabilities comprising:
   providing a graphics processing unit (GPU) core with a dedicated GPU debugging core; and
   using the dedicated GPU debugging core to perform GPU centric debug functions,
   wherein the GPU debugging core interacts with the GPU core and connects directly to a secure processing unit (SPU) core component firmware for instructions.

2. The method of claim 1 further comprising:
   displaying output from the GPU debugging core on a display.

3. The method of claim 1 wherein:
   the GPU centric debug functions arbitrate states of an accompanying CPU core.

4. The method of claim 1 wherein:
   the GPU centric debug functions directly host and debug keyboard and mouse activity.

5. The method of claim 1 wherein:
   the SPU core maintains operation when an accelerated processing unit including the GPU core and the GPU debug core is powered down; and
   the SPU core handles access restrictions for protected memory and handles GPU based resister debugging.

6. An apparatus for providing enhanced debugging capabilities comprising:
   a graphics processing unit (GPU) core portion, the GPU core portion comprising a GPU core and a dedicated GPU debugging core, the dedicated GPU debugging core enabling performance of GPU centric debug functions,
   wherein the GPU debugging core interacts with the GPU core and connects directly to a secure processing unit (SPU) core component firmware for instructions.

7. The apparatus of claim 6 further comprising:
   displaying output from the GPU debugging core on a display via the GPU core portion.

8. The apparatus of claim 6 wherein:
   the GPU centric debug functions arbitrate states of an accompanying CPU core.

9. The apparatus of claim 6 wherein:
   the GPU centric debug functions directly host and debug keyboard and mouse activity.

10. The apparatus of claim 6 wherein:
    the SPU core is not powered down when an accelerated processing unit including the GPU core and the GPU debug core is powered down; and
    the SPU core handles access restrictions for protected memory and handles GPU based resister debugging.

11. An Accelerated Processing Unit (APU) comprising:
    a central processing unit (CPU) core portion;
    a graphics processing unit (GPU) core portion coupled to the CPU core portion, the GPU core portion comprising a GPU core and a dedicated GPU debugging core, the dedicated GPU debugging core enabling performance of GPU centric debug functions,
    wherein the GPU debugging core interacts with the GPU core and connects directly to a secure processing unit (SPU) core component firmware for instructions.

12. The APU of claim 11 wherein:
    output from the GPU debugging core is presented on a display via the GPU core portion.

13. The APU of claim 11 wherein:
    the GPU centric debug functions arbitrate states of the CPU core portion.

14. The APU of claim 11 wherein:
    the GPU centric debug functions directly host and debug keyboard and mouse activity.

15. The APU of claim 11 wherein:
    the SPU core is not powered down when the APU is powered down; and
    the SPU core handles access restrictions for protected memory and handles GPU based resister debugging.

16. A computer readable media, the computer readable media comprising instructions for:
    providing a graphics processing unit (GPU) core with a dedicated GPU debugging core; and
    using the dedicated GPU debugging core to perform GPU centric debug functions,
    wherein the GPU debugging core interacts with the GPU core and connects directly to a secure processing unit (SPU) core component firmware for instructions.

17. The computer readable media of claim 16 further comprising instructions for:
    displaying output from the GPU debugging core on a display.

18. The computer readable media of claim 16 wherein:

the GPU centric debug functions arbitrate states of an accompanying CPU core.

19. The computer readable media of claim 16 wherein:

the GPU centric debug functions directly host and debug keyboard and mouse activity.

20. The computer readable media of claim 16 wherein:

the SPU core maintains operation when an accelerated processing unit including the GPU core and the GPU debug core is powered down; and the SPU core handles access restrictions for protected memory and handles GPU based resister debugging.

* * * * *